United States Patent
Lee et al.

(10) Patent No.: US 10,430,828 B2
(45) Date of Patent: Oct. 1, 2019

(54) METHOD AND SYSTEM FOR AMBIENT MEDIA SELECTION BASED ON TRANSACTION HISTORY AND DEMOGRAPHICS

(71) Applicant: MasterCard International Incorporated, Purchase, NY (US)

(72) Inventors: Edward Lee, Scarsdale, NY (US); Luckner Polycarpe, Brooklyn, NY (US); Kent Olof Niklas Berntsson, Rye, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 834 days.

(21) Appl. No.: 14/874,902

(22) Filed: Oct. 5, 2015

(65) Prior Publication Data

US 2017/0098241 A1 Apr. 6, 2017

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
CPC .............. G06Q 30/0255; G06Q 30/0269
USPC .................................. 705/14.53, 14.49
See application file for complete search history.

(56) References Cited

U.S. PATENT DOCUMENTS

| | | | |
|---|---|---|---|
| 2009/0063414 A1* | 3/2009 | White | G06F 17/30017 |
| 2013/0024242 A1 | 1/2013 | Villars et al. | |
| 2014/0025483 A1 | 1/2014 | Villars et al. | |
| 2015/0142561 A1* | 5/2015 | Gerard | G06Q 30/0261 705/14.53 |
| 2015/0216008 A1 | 7/2015 | Van De Sluis et al. | |

FOREIGN PATENT DOCUMENTS

WO  WO-2006054235 A3 * 10/2008 ........... G11B 27/034

OTHER PUBLICATIONS

Ruijiao Li, Digital Communications and Networks, 2015 (Year: 2015).*

* cited by examiner

*Primary Examiner* — Tarek Elchanti
(74) *Attorney, Agent, or Firm* — Buchanan Ingersoll & Rooney PC

(57) ABSTRACT

A method for identifying ambient media (audio and visual content) selections based on transaction history includes: storing transaction data entries, each including data related to a payment transaction including a merchant identifier associated with a merchant involved in the transaction, a primary account number associated with a transaction account used in the transaction, and transaction data; receiving a request, the request including a specific merchant identifier; identifying a subset of transaction data entries that include a merchant identifier corresponding to the specific merchant identifier; identifying sets of demographic characteristics based on the primary account number and/or the transaction data included in transaction data entries in the subset; identifying an ambient media selection corresponding to the sets of the demographic characteristics; and transmitting the identified ambient media selection corresponding to each of the sets of demographic characteristics.

28 Claims, 8 Drawing Sheets

METHOD AND SYSTEM FOR AMBIENT MEDIA SELECTION BASED ON TRANSACTION HISTORY AND DEMOGRAPHICS

FIELD

The present disclosure relates to the selection of ambient media (e.g., audio (including music) or visual content (including images, video, visual designs and/or lighting), or combinations thereof, that tend to set the mood or atmosphere of a venue, having an unobtrusive quality), based on transaction history and demographics, specifically the analysis of transaction data for a merchant and use thereof to determine consumer demographics for use in selecting ambient media content to be exhibited to consumers.

BACKGROUND

For some consumers, shopping at a particular merchant may be as much about the products being sold as the shopping experience at the merchant itself. Consumers may prefer one merchant over another, particularly in instances where the available products are the similar or the same, for a variety of reasons, including the aesthetics of the merchant location. Aesthetics may include the color and design of the storefront, the name, the flooring, the color or design of wallpaper, the look and type of decorations that are used, the color and intensity of lighting, the images or videos displayed on monitors or displays inside the merchant, and music that is being played.

In many instances, the type of music that is played for consumers or other aesthetic choices are made by management of the merchant based on assumptions of expectations, including an expectation of the type of clientele that will visit the merchant or to which the merchant wants to cater, and the expectation of the type of music or visual content that the expected clientele would prefer. However, in many cases, the merchant may be unable to accurately identify demographic information of their clientele, let alone what type of content that clientele may prefer. In addition, even if a merchant were able to identify the demographics of an average consumer, the clientele of the merchant may change over a period of time, even during a single day, and thus may vary from their determined average consumer at any given time and need reevaluation.

Thus, there is a need for a technical solution to provide for analysis of consumer demographics for a merchant based on merchant clientele at varying periods of time for use in providing selections of music or visual content. By using transaction data, such information may be identified using the methods and systems discussed herein without modification to existing merchant systems and stores, and may also analyze a merchant's clientele with respect to those who actually transact and not just visitors, which may increase revenue, and may also be able to identify music and visual content selections as they may change over time.

SUMMARY

The present disclosure provides a description of systems and methods for identifying selections of ambient media (e.g., music or visual content (including images, video, or lighting) or combinations thereof), that tend to set the mood or atmosphere of a venue, having an unobtrusive quality), based on transaction history of consumers that have or are visiting the venue, such as a merchant location. This may be in addition to targeted advertising.

A method for identifying ambient media selections based on transaction history includes: storing, in a transaction database of a processing server, a plurality of transaction data entries, wherein each transaction data entry includes data related to a payment transaction including at least a merchant identifier associated with a merchant involved in the related payment transaction, a primary account number associated with a transaction account used in the related payment transaction, and transaction data; receiving, by a receiving device of the processing server, an ambient media request, wherein the request originates from a third party entity and includes at least a specific merchant identifier; identifying, by a processing device of the processing server, a subset of transaction data entries stored in the transaction database, wherein each transaction data entry in the subset includes a merchant identifier corresponding to the specific merchant identifier; identifying, by the processing device of the processing server, at least one set of demographic characteristics based on at least one of the primary account number and the transaction data included in one or more of the transaction data entries in the identified subset of transaction data entries; identifying, by the processing device of the processing server, an ambient media selection corresponding to each identified set of demographic characteristics based on the respective demographic characteristics; and transmitting, by a transmitting device of the processing server, at least the identified ambient media selection corresponding to each of the at least one set of demographic characteristics.

A system for identifying ambient media selections based on transaction history includes a transaction database, a receiving device, a processing device, and a transmitting device of a processing server. The transaction database of the processing server is configured to store a plurality of transaction data entries, wherein each transaction data entry includes data related to a payment transaction including at least a merchant identifier associated with a merchant involved in the related payment transaction, a primary account number associated with a transaction account used in the related payment transaction, and transaction data. The receiving device of the processing server is configured to store an ambient media request, wherein the request originates from a third party entity and includes at least a specific merchant identifier. The processing device of the processing server is configured to: identify a subset of transaction data entries stored in the transaction database, wherein each transaction data entry in the subset includes a merchant identifier corresponding to the specific merchant identifier; identify at least one set of demographic characteristics based on at least one of the primary account number and the transaction data included in one or more of the transaction data entries in the identified subset of transaction data entries; and identify an ambient media selection corresponding to each identified set of demographic characteristics based on the respective demographic characteristics. The transmitting device of the processing server is configured to transmit at least the identified ambient media selection corresponding to each of the at least one set of demographic characteristics.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
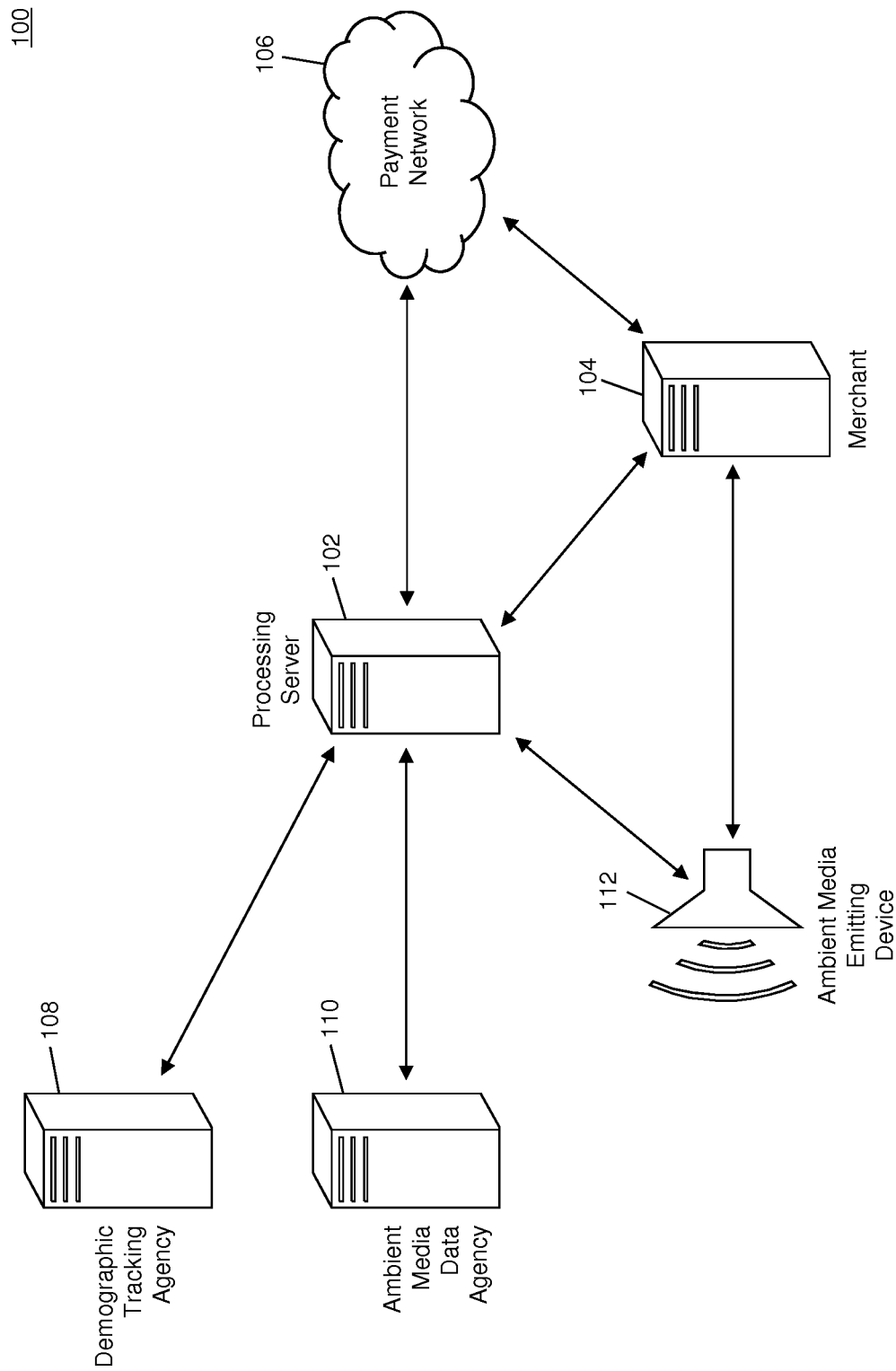
FIG. 1 is a block diagram illustrating a high level system architecture for the selection of ambient media based on transaction history and demographics for a merchant in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, the term merchant may be used to refer to computing systems and devices of the merchant. In some instances, a merchant may have special knowledge of the goods and/or services provided for purchase. In other instances, a merchant may not have or require any special knowledge in the offered products. In some embodiments, an entity involved in a single transaction may be considered a merchant.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Microsegment—A representation of a group of consumers that is granular enough to be valuable to advertisers, marketers, offer providers, merchants, retailers, etc., but still maintain a high level of consumer privacy without the use or obtaining of personally identifiable information. Microsegments may be given a minimum or a maximum size. A minimum size of a microsegment would be at a minimum large enough so that no entity could be personally identifiable, but small enough to provide the granularity needed in a particular circumstance. Microsegments may be defined based on geographical or demographical information, such as age, gender, income, marital status, postal code, income, spending propensity, familial status, etc., behavioral variables, or any other suitable type of data, such as discussed herein. The granularity of a microsegment may be such that behaviors or data attributed to members of a microsegment may be similarly attributable or otherwise applied to consumers having similar characteristics. In some instances, microsegments may be grouped into an audience. An audience may be any grouping of microsegments, such as microsegments having a common data value, microsegments encompassing a plurality of predefined data values, etc. In some instances, the size of a microsegment may be dependent on the application. Additional detail regarding microsegments and audiences may be found in U.S. patent application Ser. No. 13/437,987, entitled "Protecting Privacy in Audience Creation," by Curtis Villars et al., filed on Apr. 3, 2012, which is herein incorporated by reference in its entirety.

System for Identifying Ambient Media Selections Based on Transaction History

FIG. 1 illustrates a system 100 for the identification of ambient media selections (e.g., audio (including music, sounds of nature, or other types of sound) or visual content (including images, video, lighting, color schemes, designs, patterns, shapes, etc. of furnishings, wall coverings, window dressings, or other visual aesthetics) or combinations thereof), that tend to set the mood or atmosphere of a venue, having an unobtrusive quality) for a merchant venue based on transaction history for the merchant and demographic characteristics of consumers who transact, or have transacted, with the merchant. The selection of content is based upon transaction data of electronically processed transactions initiated by a merchant point-of-sale device or by an alternative device, wherein the transaction data includes data identifying the merchant.

The system 100 may include a processing server 102, discussed in more detail below, configured to identify ambient media selections based on electronic transaction data associated with a specified merchant and/or merchant computer system 104. The merchant and/or merchant system 104 may have a physical location at which consumers may purchase items. As part of the purchasing process, the merchant system 104 may initiate electronically processed payment transactions using a point of sale device and the transactions may be processed by one or more payment networks 106 using traditional methods and systems. In some instances, a consumer device may be substituted for the merchant point-of-sale system and the transaction may be initiated from the consumer device while in communication with a merchant device or while the consumer device is located at the merchant's physical location.

For instance, the merchant system 104 may electronically submit transaction data for a payment transaction that includes payment details received by the system from a consumer (e.g., from communicating with a consumer device via near-field-communication or other known methods, reading data from a magnetic strip of a physical card provided by a consumer, etc.) for identification of a transaction account to be used to fund the transaction as well as transaction details (such as transaction amount, product data, point of sale data, offer data, etc.) to an acquiring financial institution, such as an acquiring bank, which may generate an authorization request for the transaction. The authorization request may be a type of transaction message, which is a specialized data set formatted based on one or more standards, such as the International Organization for Standardization's ISO 8583 standard, that includes a plurality of data elements, each configured to store data as set forth by the associated standards, that may be transmitted to the payment network 106 via a specialized infrastructure configured to communicate transaction messages between specially configured computing systems, known as the "payment rails," described in more detail below with respect to the process 600 illustrated in FIG. 6. The payment network 106 may receive the authorization request and may process the transaction accordingly using traditional methods and systems. Detailed system architecture for the processing of a payment transaction is discussed in more detail below in the system 600 illustrated in FIG. 6 and discussed below.

The processing server 102 may be configured to receive transaction data for a plurality of payment transactions involving the merchant and/or merchant system 104 from the payment network 106. In some embodiments, the processing server 102 may be a specially configured computing device configured to communicate using the payment rails, and may receive the transaction data via the transmission of transaction messages from the payment network 106. In other embodiments, the processing server 102 may be a part of the payment network 106 and may, in some cases, be configured to process payment transactions. In such embodiments, transaction data may be captured during or subsequent to the processing of payment transactions in the payment network 106.

Transaction data acquired by the processing server 102 may include at least a primary account number, or number associated therewith, for each payment transaction. In some instances, the primary account number may be replaced in the transaction data by an encrypted number. In such instances, the primary account number may be encrypted using a suitable method of one-way encryption such that the processing server 102 may be unable to identify the primary account number to which the encrypted number corresponds. In such a case, the processing server 102 may not be able to personally identify a consumer or transaction account associated with any given payment transaction. Transaction data acquired by the processing server 102 may include transaction data for payment transactions conducted at the physical location of the merchant system 104, as well as additional transactions. For instance, the transaction data may also include transactions conducted remotely with the merchant system 104, such as online transactions, mail order transactions, telephone transactions, etc., or transactions conducted at a different location of the merchant, such as in instances where the merchant may have multiple storefronts.

The processing server 102 may be configured to identify demographic characteristics of the consumers which transact with merchant 104 using the transaction data. The processing server 102 may receive demographic characteristic data, such as may be provided by a demographic tracking agency 108 via a device thereof. The term "demographic tracking agency" as used herein may refer to one of or both of the demographic tracking agency and a system/device thereof. The demographic tracking agency 108 may communicate, via a demographic tracking agency 108 device (e.g., a computing system, etc.), demographic characteristic data to the processing server 102 via electronic transmission of data signals superimposed with the data, which may be transmitted via suitable communication networks. Communication networks may include, for example, the Internet, cellular communication networks, radio frequency, local area networks, etc. The demographic characteristic data may include primary account numbers or numbers associated thereof and one or more demographic characteristics associated with the numbers. In some instances, each number may be individually associated with one or more demographic characteristics. In other instances, numbers may be grouped together, such as in a microsegment, where each number in the group is associated with the same set of one or more demographic characteristics. Demographic characteristics may include gender, age, income, education, occupation, residential status, familial status, relationship status, marital status, zip code, postal code, ethnicity, and any other demographic characteristic that will be apparent to persons having skill in the relevant art. The demographic tracking agency 108 may collect demographic characteristic data for consumers using traditional methods and systems, such as census data, surveys, etc. and may electronically store the data and distribute the data according to traditional methods and systems.

In some embodiments, the demographic tracking agency 108 may provide demographic characteristic data to the processing server 102, which may store the demographic characteristic data in a local database. The local database may be included in the processing server 102 or may be external to the processing server 102 and accessed remotely via a communication network. For instance, the demographic characteristics may be stored in an external database and accessed via cloud computing techniques. In other embodiments, the processing server 102 may electronically transmit a data signal comprising a data request to the demographic tracking agency 108 to request demographic characteristics for specific consumers or groups of consumers, such as consumers of the merchant 104 as identified using transaction data for the merchant 104. The demographic tracking agency 108 may identify demographic characteristics for the specific consumers or groups of consumers, and may electronically transmit a data signal superimposed with the data back to the processing server 102, which may receive and parse the demographic characteristic data to identify particular characteristic data to be used within the systems and methods disclosed herein. The processing server 102 may store the demographic characteristic data, or identified subsets of characteristic data, within an electronic data store, which may be part of the processing server 102 or external thereto.

In some embodiments, demographic characteristics may be matched to transaction data by the processing server 102 or a system/device of the demographic tracking agency 108 based on primary account numbers (e.g., which may be encrypted via one-way encryption). In such embodiments, the demographic tracking agency 108 may provide (e.g., by way of a system or device thereof, etc.) demographic characteristic data that includes account numbers or groups of account numbers, and, for each account number or group, one or more demographic characteristics associated therewith. The processing server 102 may identify a primary account number for each payment transaction involving the merchant 104 from the associated transaction data, such as by extracting the account number from a data element included within a transaction message for a payment transaction, wherein the data element is configured to store a primary account number associated with the respective payment transaction. In some embodiments, the account number identified from the transaction data may then be encrypted via a one-way encryption by the processing server 102 for use in a matching process. For example, the processing server 102 and demographic tracking agency 108 may each use the one-way encryption to encrypt primary account numbers, such that demographic characteristics may be associated with transaction data using the encrypted account numbers, without the demographic characteristics being associated with an unencrypted account number. Additional detail regarding matching two data sets via encrypted identifiers may be found in U.S. patent application Ser. No. 13/554,402, entitled "System and Method for Protecting Consumer Privacy in the Measuring of the Effectiveness of Advertisements," filed on Jul. 20, 2012, by Curtis Villars et al., which is herein incorporated by reference in its entirety.

The demographic characteristics may then be matched to the consumers of the merchant 104 using the account numbers. In embodiments where matching is performed by the processing server 102, the processing server 102 may include a specially configured module or engine that is configured to match the account numbers provided by the demographic tracking agency 108 to the account numbers extracted from the transaction data provided by the payment network 106 for transactions involving the merchant 104. The specially configured module or engine may be software or hardware that is configured to execute a query on a demographic characteristic database, wherein the demographic characteristic database comprises data entries containing the received and parsed demographic characteristic data. The data entries may be segmented based upon, for example, account number, or other identifying characteristics of a single consumer or group of consumers. The specially configured module or engine may be further configured to execute a query on transaction data stored in a transaction database, in a similar manner as the query of the demographic characteristic database. The transaction database and demographic database may or may not be similarly organized and contain similar fields of information. The module or engine may query each database based upon a particular value (e.g., account number, etc.) a group of values (e.g., certain behavioral data, etc.) or may execute a process which compares, for example, the demographic characteristic and transaction databases to identify data entries containing similar values (e.g., match multiple account numbers and/or other values present in each database, etc.). In some embodiments, other algorithms for executing a matching or comparison process known to those skilled in the art may be implemented to perform the matching process. In some embodiments, the module may output demographic characteristics retrieved from the demographic characteristic database that are associated with some or all of the matches determined by the module.

In some embodiments the account numbers provided by the demographic tracking agency and/or those extracted from the transaction data may be encrypted. The demographic characteristics associated with each account number that is matched from the demographic characteristic data may then be associated with the merchant 104. In embodiments where matching is performed by the demographic tracking agency 108, the processing server 102 may electronically transmit a data signal superimposed with the account numbers identified from the transaction data involving the merchant 104 to the demographic tracking agency 108, which may perform the matching and then return the demographic characteristics of the consumers of the merchant 104 via an electronic transmission to the processing server 102.

In some embodiments, demographic characteristics may be matched to consumers using purchase behaviors. In such embodiments, the processing server 102 may be configured to identify, using a specially configured module or engine, purchase behaviors for the payment transactions involving the merchant 104. This specifically configured module or engine may be hardware or software, configured to execute a matching or comparison process, such as that described in more detail, above. Purchase behaviors may be identified based on transaction data for one or more of the payment transactions, which may include, for example, transaction amount, product data, consumer data, offer data, reward data, transaction time and/or date, etc. The purchase behaviors identified by the processing server 102 may include, for instance, average ticket size, transaction frequency, product purchasing data, return consumer frequency, first-time consumer frequency, number of transactions, etc. The purchase behaviors may then be matched to demographic characteristics by the processing server 102 or demographic tracking agency 108, used in place of account numbers. For example, the demographic tracking agency 108 may provide demographic characteristics correlated with a purchase behavior, and the processing server 102 may identify purchase behaviors for the merchant system 104 using transaction data, and thereby associate demographic characteristics to the merchant system 104 based on the correlation between demographic characteristics and purchase behavior.

Using the demographic characteristics of the consumers of the merchant 104, the processing server 102 may be configured to identify ambient media selections for the merchant 104. In some embodiments, the processing server 102 may electronically transmit a data signal superimposed with the demographic characteristics to a device or system of an ambient media data agency 110. As used herein, the term "ambient media data agency" may refer to one or both of the entity itself or a device/system thereof, depending on context. The ambient media data agency 110 may be configured to store associations between ambient media genres or other ambient media selections and demographic characteristics (e.g., the ambient media data agency may be an agency which runs an ambient media streaming service, an ambient media distribution platform, an ambient media retailer, a research agency, etc.). The ambient media data agency 110 may identify music and/or visual content selections associated with the demographic characteristics provided by the processing server 102 (e.g., and associated with consumers of the merchant 104) and may electronically transmit a data signal superimposed with the ambient media selections back to the processing server 102. In other embodiments, the ambient media data agency 110 may provide associations between ambient media selections and demographic characteristics to the processing server 102, which may be stored in a database of the processing server 102, such that the processing server 102 may use the data provided by the ambient media data agency 110 to match ambient media selections to the identified demographic characteristics.

Ambient media selections may include one or more ambient media genres, selection of playlists, selection of songs, videos, lighting and/or images, selection of artists, radio stations, or any other type of selection that may be used to identify ambient media to be played at the merchant 104 based on the demographic characteristics of that merchant's clientele. With the increased ability of lighting systems (particularly powered by light emitting diodes), the tone, color, temperature, intensity and display pattern of lighting devices can be dynamically changed by a controller (not shown) in a known fashion. See, e.g., U.S. Pub. Pat. Appl. 20150216008, published Jul. 30, 2015, herein incorporated by reference. Once the selection has been identified, in some embodiments, the processing server 102 may generate a data signal superimposed with the ambient media selection and electronically transmit it to the merchant 104. The merchant 104 may then use the ambient media selection or identify ambient media based on the ambient media selection, which may be emitted via an ambient media emitting device 112 at the merchant's location. In other embodiments, the processing server 102 may be configured to communicate directly with the ambient media emitting device 112, and may electronically transmit the ambient media selection as an instruction to the ambient media emitting device 112 to play ambient media associated thereto. In some such embodiments, the processing server 102 may be part of a computing system of the merchant 104. In other embodiments, the processing server 102 may be external to the merchant 104 and may access the ambient media emitting device 112 remotely, such as via a communication network and using remote communication techniques, such as cloud computing techniques.

In some instances, the processing server 102 may identify a plurality of ambient media selections for the merchant 104. For example, the processing server 102 may identify demographic characteristics of the consumers of the merchant 104 at a plurality of periods of time. For instance, the processing server 102 may identify demographic characteristics of consumers of the merchant 104 based on time of day and day of the week, such as by identifying account numbers or purchase behaviors using transaction data for payment transactions with transaction times and/or dates that correspond to the respective time of day and day of week. The processing server 102 may then identify an ambient media selection for each of the times of day and days of week, such that the ambient media emitting device 112 may emit a different music, video, lighting and/or image selection (e.g., song, image, video, artist, playlist, genre, lighting color or intensity, etc., or combinations thereof) based on the demographic characteristics at the given time of day and day of week. In such instances, the music played at the merchant 104 may vary based on changes in their clientele over the course of a day, and from one day to the next.

In some embodiments, the processing server 102 may be configured to identify music selections in real-time or near real-time based on payment transactions involving the merchant 104 as they are conducted. In such an embodiment, when a payment transaction is initiated by the merchant 104, transaction data may be transmitted to the processing server 102 from the merchant 104 directly or by the payment network 106 used to process the payment transaction. The processing server 102 may use the transaction data for the payment transaction to update the demographic characteristics for the merchant 104 and identify an appropriate ambient media selection based thereon. For example, the processing server 102 may add the new transaction data to the transaction data for the merchant 104, and may repeat the identification of demographic characteristics for the merchant based thereon, and thereby update the ambient media selection for the merchant 104. Thus, the ambient media selection of the merchant 104 may evolve based on changes in the clientele of the merchant 104 as they happen in real-time or near real-time.

The methods and systems discussed herein enable the processing server 102 to identify ambient media selections for a merchant 104 that are specifically tailored to the clientele of the merchant 104, and thus can improve the atmosphere of the merchant 104 and increase revenue and the frequency of return consumers for the merchant 104. By using transaction data, the processing server 102 may identify ambient media selections without modification to the computing systems of the merchant 104, and without requiring the merchant 104 to perform any data collection, thus enabling the merchant 104 to make use of the selections of the processing server 102 with minimal effort. In addition, the use of transaction data may also enable the identification of ambient media selections in real-time or near real-time, which may be of even greater benefit to merchants 104 and also even more difficult for a merchant 104 to perform without the assistance of the processing server 102 due to difficulty in collecting and analyzing data regarding clientele with such speed and efficiency. Thus, the processing server 102 and the methods and systems discussed herein may provide greatly improved identification of ambient media selections for a merchant 104 using transaction history.

In addition, the methods and systems discussed herein may also be applied to the selection of visual content for a merchant 104, as mentioned above. In such instances, the ambient media data agency 110 may be a data agency configured to (or additionally configured to) store correlations between visual content (and music and/or combinations of music and various types of visual content, in certain embodiments) and demographic characteristics. The processing server 102 may receive the correlations directly from the ambient media data agency 110 via a suitable communication network and may select visual content based on the correlations and the demographic characteristics identified for the merchant 104. The selections may then be transmitted to the merchant 104 or directly to one or more electronic devices for the control and usage of visual content.

Visual content may include any type of content that is visually emitted to consumers of the merchant 104. For example, visual content may include images or videos that are displayed on display devices at the merchant 104, such as television shows, movies, slide shows, etc. In another example, visual content may include lighting. For instance, visual content selection in the context of lighting may include the amount of lighting, color of lighting, lighting intensity, etc. For example, the selection by the processing server 102 may be for the merchant 104 to adjust light color and intensity during the course of a day based on demographics of their clientele at various times of the day. In yet another example, visual content may include color, design, pattern, shape, etc. of furnishings, wall coverings, window dressings, or other visual aesthetics of the merchant 104. In such instances, the merchant 104 may adjust wall coverings, window dressings, or other visual aesthetics at specific times of day, days of the week, times of year, etc. based on changes in clientele to accommodate preferences for the demographic characteristics of the clientele as they change.

Processing Server

Figure 2:
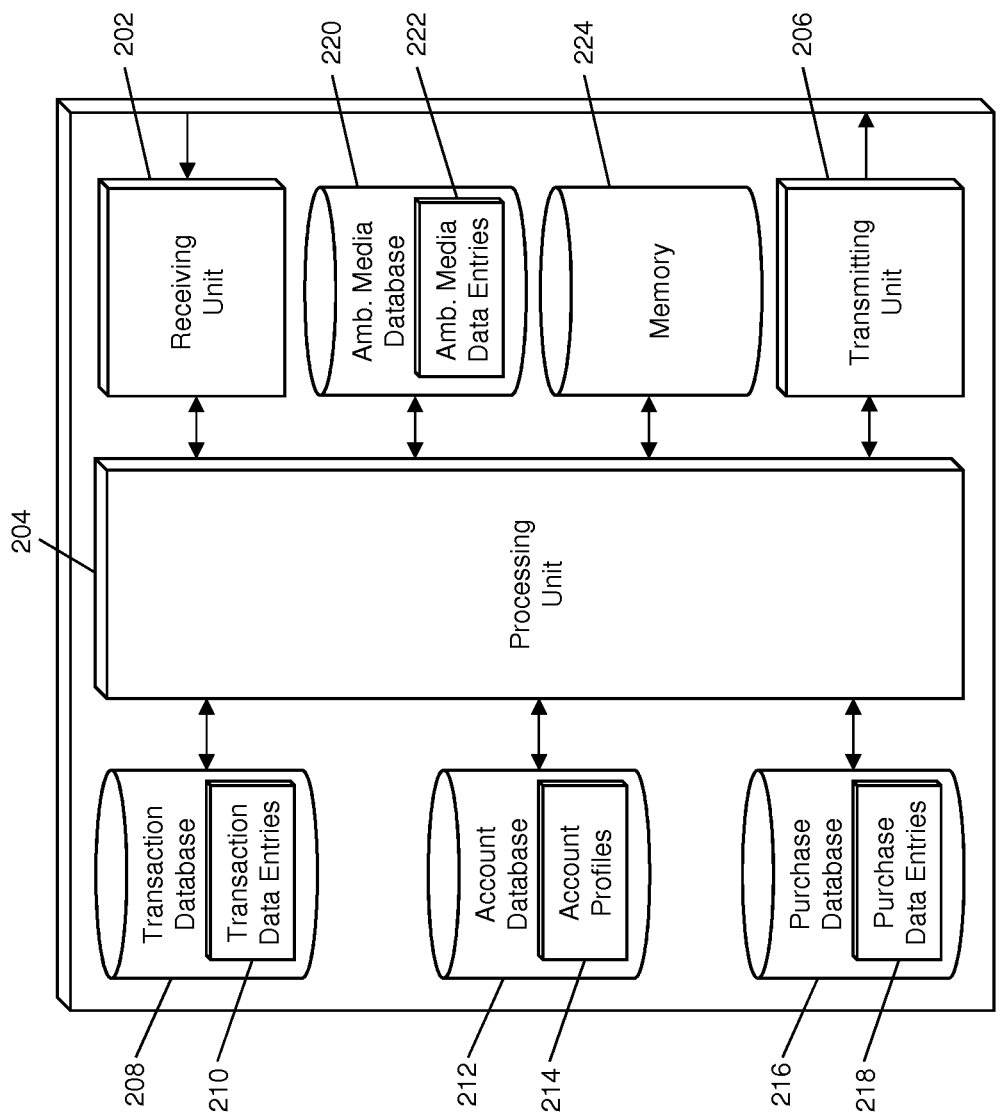
FIG. 2 is a block diagram illustrating the processing server of FIG. 1 for the identification of ambient media selections for a merchant based on transaction history and consumer demographics in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 106 for the transmission of transaction messages that include sensitive financial data and information. In some instances, the receiving unit 202 may also be configured to receive data from merchants 104, demographic tracking agencies 108, ambient media data agencies 110, and other entities, via devices of such entities, via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive electronically data signals that are transmitted, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon. The parsing module may be software or hardware configured to receive a data signal, parse the data received in the signal and output the data in a usable form for the performance of the methods and systems disclosed herein.

The receiving unit 202 may be configured to receive transaction data from the payment network 106 using the payment rails or other suitable communication network. In some instances, the transaction data may be included in specially formatted transaction messages, which may comprise a plurality of data elements configured to store data as set forth in the associated standards. The receiving unit 202 may also be configured to receive demographic characteristic data from demographic tracking agencies 108 and ambient media data from ambient media data agencies 110. Ambient media data may include correlations between ambient media selections (e.g., genres, artists, songs, playlists, etc.) and demographic characteristics.

The processing server 102 may also include a processing unit 204. The processing unit 204 may be configured to perform the functions of the processing server 102 discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases included in the processing server 102 to identify information stored therein. The querying module may receive an input of a particular value and/or algorithm to employ to execute a query, execute the query based upon the input data and/or algorithm (or a pre-programmed algorithm of the querying module) and output data responsive to the input value and/or algorithm. In some instances, the processing unit 204 may include a parsing module or engine configured to parse data from data signals electronically received by the receiving unit 202, an encryption module or engine configured to decrypt received data or data signals or to encrypt data or data signals received or transmitted by the processing server 102, using encryption methods as will be apparent to those skilled in the art, and any other modules suitable for performing the functions discussed herein. As used herein, the term "module" may describe particularly programmed hardware or software, wherein the module is configured to perform the functions by which it is defined.

The processing server 102 may also include a transaction database 208. The transaction database 208 may be configured to store a plurality of transaction data entries 210 using a suitable data storage format and schema. Each transaction data entry 210 may include data related to a payment transaction. In some embodiments, each transaction data entry 210 may comprise a specially formatted transaction message. Each transaction data entry 210 may include at least a primary account number associated with a transaction account used to fund the related payment transaction, a merchant identifier, and transaction data. The primary account number may, in some instances, be an encrypted account number. The merchant identifier may be a unique value associated with a merchant suitable for the identification thereof, such as a merchant identification number, registration number, point of sale identifier, transaction account number, etc. The transaction data may include a transaction amount, transaction time and/or date, consumer data, merchant data, offer data, reward data, loyalty data, point of sale data, geographic location data, and any other data that may be suitable for use in performing the functions disclosed herein.

In some embodiment, the processing server 102 may also include an account database 212. The account database 212 may be configured to store a plurality of account profiles 214 using a suitable data storage format and schema. Each account profile 214 may include data related to a transaction account including at least an account number associated with the related transaction account and one or more demographic characteristics associated with the related transaction account. In such embodiments, the account profiles 214 may be generated by an appropriate module or engine of the processing unit 204 based on transaction data entries 210 stored in the transaction database 208 and demographic characteristics received from the demographic tracking agency 108 by the receiving unit 202. For example, a querying module of the processing unit 204 may query the transaction database 208 to identify account numbers included in the transaction data entries 210 stored therein, and a matching module may be configured to match the account numbers with account numbers included in demographic characteristic data received and parsed by the receiving unit 202 by receiving input of the two sets of data (e.g., account numbers from the transaction database 208 and account numbers and demographic characteristics) and outputting the matched demographic characteristics and transaction data entry 210 account numbers. The processing unit 204 may then store the associated one or more demographic characteristics in an account profile 214 with the respective account number, to be stored in the account database 212. In some embodiments, each account profile 214 may include data related to a microsegment of transaction accounts. For instance, an account profile 214 may include account numbers for a plurality of transaction accounts comprising a microsegment, where each account number included in the microsegment is associated with the same one or more demographic characteristics.

In some embodiments, the processing server 102 may include a purchase database 216. The purchase database 216 may be configured to store a plurality of purchase data entries 218 using a suitable data storage format and schema. The purchase data entries 218 may include data related to a purchase behavior including at least one demographic characteristic associated with the related purchase behavior. The associated demographic characteristics for purchase behaviors may be identified by the processing unit 204 from data from the demographic tracking agency 108 received and parsed by the receiving unit 202. In some instances, the processing unit 204 may include a module or engine configured to associate demographic characteristics and purchase behaviors based on purchase behaviors for transaction accounts and their associated demographic characteristics. For instance, an analytic module or engine of the processing unit 204 may identify purchase behaviors for a transaction account based on transaction data in transaction data entries 210 related to payment transactions involving the transaction account (e.g., including the associated account number) by inputting the transaction data entries 210 and outputting purchase behaviors, and may associate the demographic characteristics of the transaction account (e.g., as stored in a corresponding account profile 214) with the identified purchase behaviors. In some instances, the processing unit 204 may associate demographic characteristics with purchase behaviors based on an aggregation of purchase behavior and demographic characteristic associations over a plurality of different transaction accounts.

The processing unit 204 may be configured to identify demographic characteristics of consumers of a merchant 104. The processing unit 204 may include a querying module configured to execute a query on the transaction database 208 to identify transaction data entries 210 where the included merchant identifier corresponds to a merchant identifier associated with a particular merchant 104. In embodiments where demographic characteristics are associated with account numbers, the querying module may execute a query on the account database 212 to identify account profiles 214 where the included account number corresponds to an account number included in one of the identified transaction data entries 210. The demographic characteristics of the identified account profiles 214 may then be analyzed by an analytic engine or module of the processing unit 204 and associated with the merchant 104. Analysis may be used, for instance, to identify outliers in the demographic characteristics, identify average demographic characteristics, etc.

In some embodiments, the processing server 102 may further include a ambient media database 220. The ambient media database 220 may be configured to store a plurality of ambient media data entries 222 using a suitable data storage format and schema. Each ambient media data entry 222 may include data related to a ambient media selection including one or more associated demographic characteristics.

The processing unit 204 may be configured to identify ambient media selections for a merchant 104 using the demographic characteristics associated with the clientele of the merchant 104. The querying module of the processing unit 204 may execute a query on the ambient media database 220 to identify a ambient media data entry 222 where the included demographic characteristics correspond to the demographic characteristics identified for the merchant 104. The processing unit 204 may then identify the ambient media selection related to the identified ambient media data entry 222.

The processing server 102 may further include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 106 for the transmission of transaction messages that include sensitive financial data and information, such as identified payment credentials. In some instances, the transmitting unit 206 may be configured to transmit data to merchants 104, payment networks 106, demographic tracking agencies 108, ambient media data agencies 110, ambient media emitting devices 112, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to transmit identified ambient media selections to the merchant 104 or directly to the ambient media emitting device 112 via superimposition of ambient media selections on data signals electronically transmitted thereto using suitable communication networks and protocols. In some embodiments, the transmitting unit 206 may also be configured to transmit data requests to entities, such as the demographic tracking agency 108 and ambient media data agency 110. For example, the transmitting unit 206 may electronically transmit a data signal superimposed with a data request to the demographic tracking agency 108 that includes account numbers or purchase behaviors, such that the demographic tracking agency 108 may return (e.g., as received and parsed by the receiving unit 202) associated demographic characteristics. In such an example, the processing server 102 may not include the account database 212 or purchase database 216. In another example, the transmitting unit 206 may electronically transmit a data signal superimposed with a data request to the ambient media data agency 110 that includes demographic characteristics, such that the ambient media data agency 110 may return (e.g., as received and parsed by the receiving unit 202) associated ambient media selections. In such an example, the processing server 102 may not include the ambient media database 220.

The processing server 102 may also include a memory 224. The memory 224 may be configured to store data for use by the processing server 102 in performing the functions discussed herein. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for application programs, rules and algorithms for generating purchase behaviors, playlist, song, and artist data related to ambient media genres, and other data that may be suitable for use by the processing server 102 in the performance of the functions disclosed herein as will be apparent to persons having skill in the relevant art.

In embodiments where visual content selections may be identified by the processing server 102, the components of the processing server 102 illustrated in FIG. 2 and discussed herein may be configured to perform the functions discussed above as related to visual content alternatively or in addition to ambient media. For instance, the processing server 102 may include a visual content database, similar to the ambient media database 220, configured to store visual content selections and associated demographic characteristics, the processing unit 204 may be configured to identify visual content selections based on demographic characteristics, the transmitting unit 206 may be configured to transmit visual content selections, etc.

Process for Identifying Ambient Media Selections Based on Transaction History

Figure 3A:
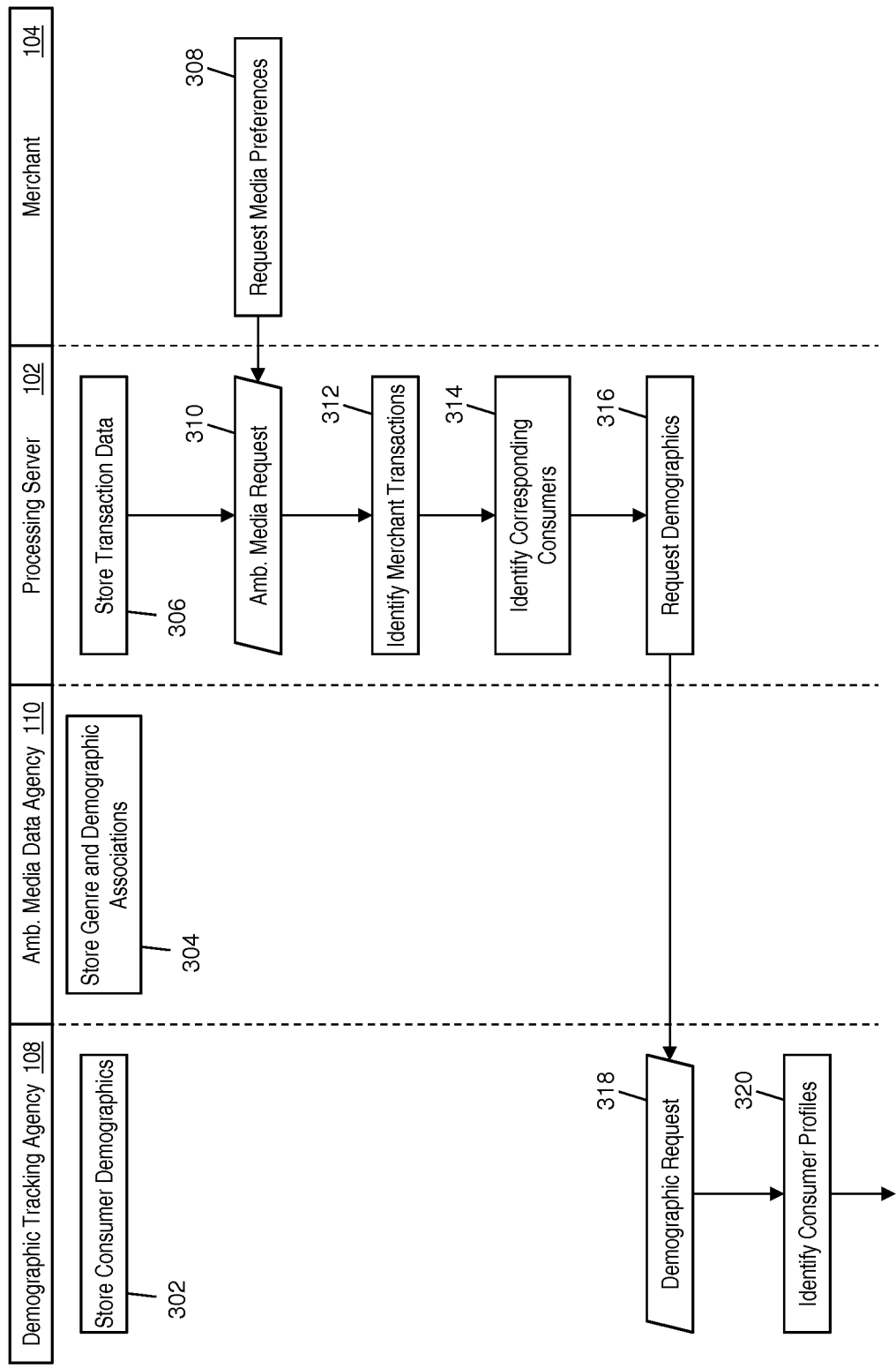
FIGS. 3A and 3B are a flow diagram illustrating a process for the identification of ambient media selections at a merchant based on consumer demographics determined using transaction history using the system of FIG. 1 in accordance with exemplary embodiments.
Figure 3B:
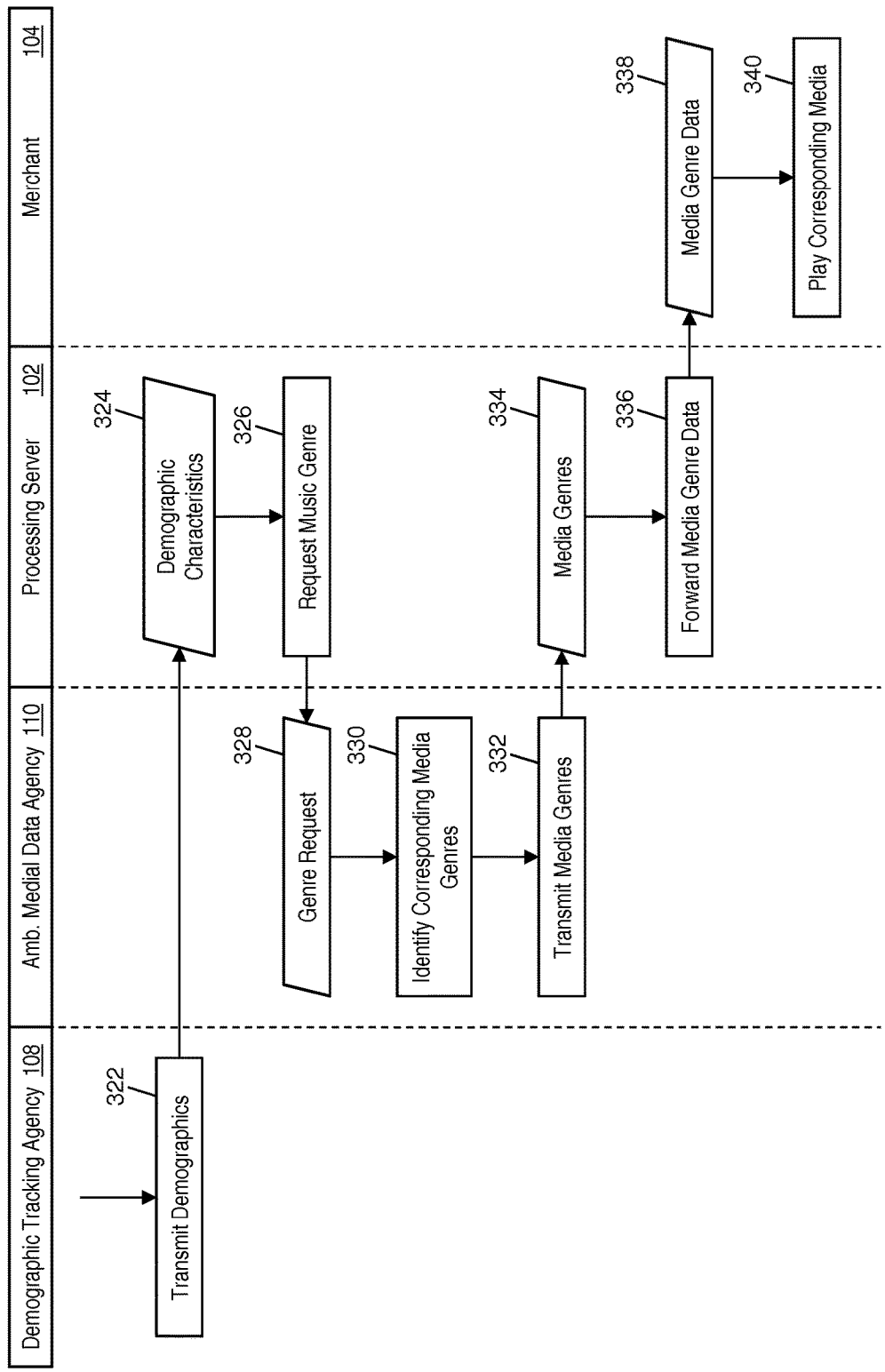

FIG. 3 illustrates a process 300 for the identification of ambient media selections in the system 100 using transaction history and demographic characteristics for a merchant 104.

In step 302, the demographic tracking agency 108 may store consumer demographics. The consumer demographics may include one or more demographic characteristics associated with each of a plurality of account numbers, groups of account numbers (e.g., microsegments), or purchase behaviors. Demographic characteristics may include, for example, age, gender, income, education, occupation, residential status, familial status, relationship status, marital status, ethnicity, zip code, postal code, etc. In some instances, demographic characteristics may be represented by an exact value (e.g., an age of 30 years) or a range of values (e.g., an age between 25 and 30).

In step 304, the ambient media data agency 110 may be configured to store associations between ambient media genres and demographic characteristics. In some instances, each ambient media genre may be associated with a unique set of demographic characteristics. In other instances, some sets of demographic characteristics may be associated with multiple ambient media genres. In some embodiments, ambient media genres may include genres and subgenres of a specific genre, such as classic rock as a subgenre of rock.

In step 306, the processing server 102 may store transaction data, such as in a plurality of transaction data entries 210 in the transaction database 208. Each transaction data entry 210 may include data related to a payment transaction including at least a merchant identifier associated with a merchant 104 involved in the payment transaction, an account number associated with a transaction account involved in the payment transaction, and transaction data. In step 308, the merchant 104 may electronically transmit a data signal to the processing server 102 superimposed with data comprising a request for ambient media preferences. The request for ambient media preferences may include at least the merchant identifier associated with the merchant 104. In some embodiments, the request may also include one or more times and/or dates for which ambient media preferences are requested, such as a request for ambient media preferences for a specific day of the week or for specific time ranges.

In step 310, the receiving unit 202 of the processing server 102 may receive the data signal from the merchant 104, which may be parsed by a parsing module or engine of the receiving unit 202 or processing unit 204 to obtain the request for ambient media preferences. In step 312, the querying module of the processing unit 204 of the processing server 102 may execute a query on the transaction database 208 to identify transaction data entries 210 where the included merchant identifier corresponds to the merchant identifier associated with the merchant 104 as included in the parsed request for ambient media preferences. In step 314, the processing unit 204 may identify the account number included in each of the identified transaction data entries 210 to identify consumers of the merchant 104.

In step 316, the transmitting unit 206 of the processing server 102 may electronically transmit a data signal to the demographic tracking agency 108 superimposed with the identified account numbers. In step 318, the demographic tracking agency 108 may receive the data signal and parse it to obtain the consumer account numbers. In step 320, the demographic tracking agency 108 may identify profiles for the account numbers and identify the demographic characteristics associated thereto. In step 322, the demographic tracking agency 108 may electronically transmit a data signal back to the processing server 102 superimposed with the demographic characteristic associations for the account numbers.

In step 324, the receiving unit 202 of the processing server 102 may receive the data signal from the demographic tracking agency 108, which may be parsed by the parsing module or engine of the receiving unit 202 or processing unit 204 to obtain the demographic characteristics associated with each of the account numbers. In step 326, the transmitting unit 206 of the processing server 102 may electronically transmit a data signal to the ambient media data agency 110 superimposed with a ambient media genre request, the ambient media genre request including at least the demographic characteristics associated with the account numbers. In some embodiments, a module of the processing unit 204 may first analyze the demographic characteristics prior to inclusion in the ambient media genre request, such as to identify average demographic characteristics of consumers of the merchant 104. In some instances, the ambient media genre request may include a plurality of sets of demographic characteristics, such as for identification of ambient media selections for multiple periods of time.

In step 328, the ambient media data agency 110 may receive the ambient media genre request and may parse the request to obtain the demographic characteristics included therein. In step 330, the ambient media data agency 110 may identify ambient media genres that correspond to the demographic characteristics included in the ambient media genre request using the stored association data. In step 332, the ambient media data agency 110 may electronically transmit a data signal to the processing server 102 superimposed with data comprising the ambient media genres identified for each set of demographic characteristics provided to the ambient media data agency 110. In step 334, the receiving unit 202 of the processing server 102 may receive the data signal from the ambient media data agency 110, which may be parsed by the receiving unit 202 or processing unit 204 to obtain the identified ambient media genres.

In step 336, the transmitting unit 206 of the processing server 102 may electronically transmit a data signal superimposed with the identified ambient media genres to the merchant 104. In step 338, the merchant 104 may receive the data signal and parse the signal to obtain the identified ambient media genre selections. In step 340, the merchant 104 may then play ambient media in their store using the ambient media emitting device 112 based on the ambient media genre selections provided by the processing server 102.

Figure 4:
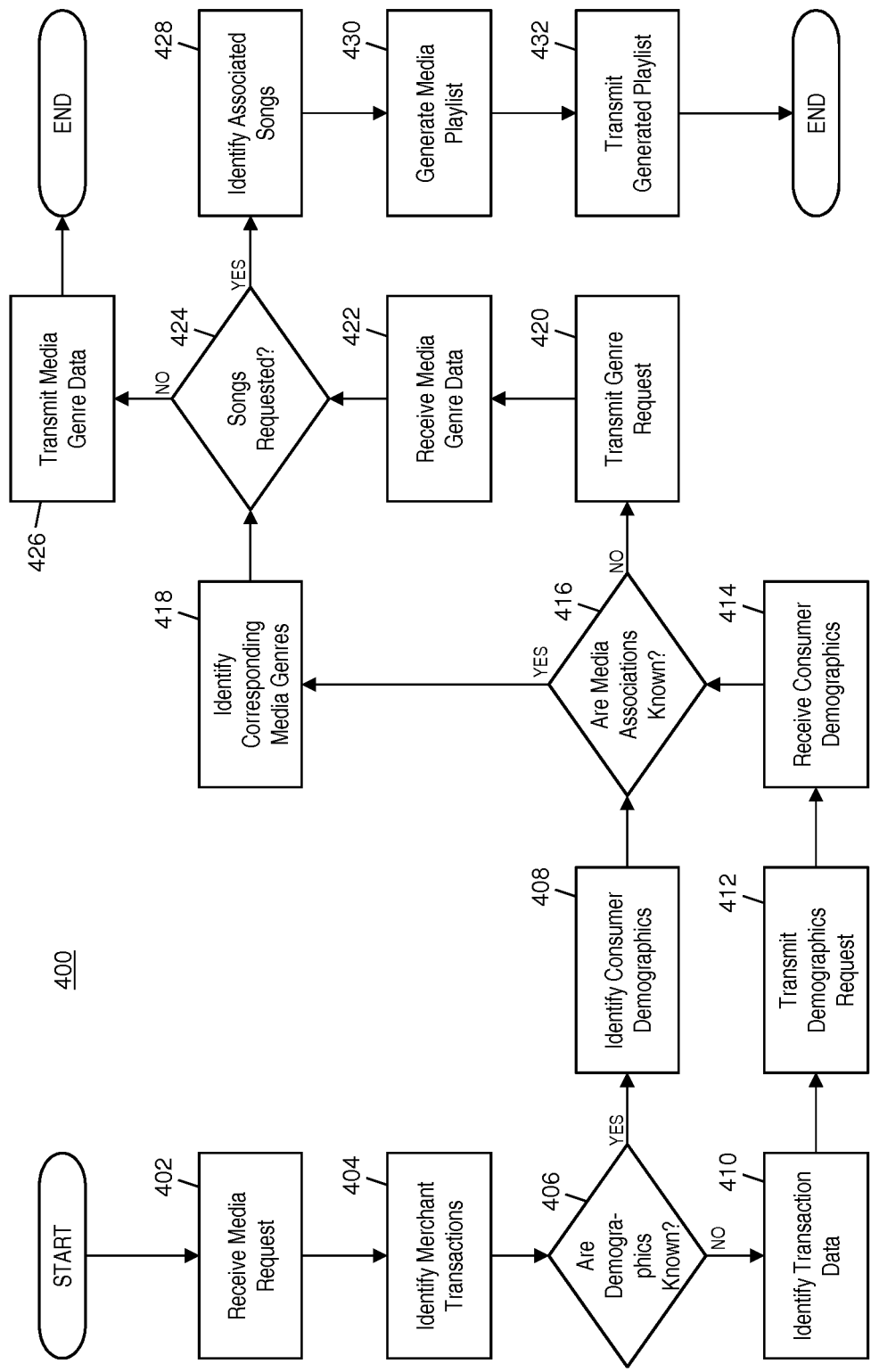
FIG. 4 is a flow diagram illustrating a method for identifying ambient media selections based on transaction history and demographics using the processing server of FIG. 2 in accordance with exemplary embodiments.

FIG. 4 illustrates a process for the identification of ambient media selections based on transaction history using the processing server 102.

In step 402, the receiving unit 202 of the processing server 102 may receive a data signal superimposed with data comprising a ambient media request. The receiving unit 202 or processing unit 204 of the processing server 102 may parse the received data signal to obtain the ambient media request, which may include at least a merchant identifier associated with a merchant 104. In some embodiments, the ambient media request may also include one or more periods of time for which ambient media selections are requested, and may further include data indicating the type of ambient media selection (e.g., songs, playlists, genres, artists, albums, etc.) requested.

In step 404, the querying module of the processing unit 204 may execute a query on the transaction database 208 of the processing server 102 to identify a plurality of transaction data entries 210 where the included merchant identifier corresponds to the merchant identifier included in the ambient media request. In instances where the ambient media request includes specified periods of time, the processing unit 204 may identify groups of transaction data entries 210 for each period of time based on a transaction time and/or date included in the respective transaction data. In step 406, the processing unit 204 may determine if demographic characteristics are already known for the transaction accounts involved in the identified plurality of transaction data entries 210. The determination may be based on, for instance, the existence of the account database 212 and account profiles 214 included therein that correspond to the transaction accounts involved in the identified transaction data entries 210.

If the demographics for the transaction accounts are known, then, in step 408, the querying module of the processing unit 204 may execute a query on the account database 212 to identify account profiles 214 where the included account number corresponds to an account number included in one of the identified plurality of transaction data entries 210, and may identify consumer demographics for the merchant 104 from the demographic characteristics included in each of the identified account profiles 214. The demographic characteristics that are identified may, in some instances, be associated with every account number corresponding to one of the identified transaction data entries 210, may be associated with a majority of account numbers, or may be an average of demographic characteristics associated with the account numbers. If the demographics for the transaction accounts are not known, then, in step 410, the processing unit 204 may identify purchase behaviors for the identified transaction data entries 210 using the transaction data included therein. In step 412, the transmitting unit 206 may electronically transmit a data signal superimposed with the purchase behaviors to the demographic tracking agency 108. In step 414, the receiving unit 202 may receive a data signal superimposed with the demographic characteristics associated with the purchase behaviors, such as may be electronically transmitted to the processing server 102 by the demographic tracking agency 108. In embodiments where the ambient media request includes multiple periods of time, the demographic characteristics may be separated into groups, each corresponding to a period of time.

Once the demographic characteristics are identified, then, in step 416, the processing unit 204 may determine if associations between ambient media selections and demographic characteristics are already known. This determination may be based on, for instance, the existence of the ambient media database 220 and inclusion of ambient media data entries 222 with demographic characteristics corresponding to the identified demographic characteristics using one or more algorithms configured to match demographic characteristics of ambient media data entries 222 to demographic characteristics identified for the transaction data. If the associations are known, then, in step 418, the querying module of the processing unit 204 may execute a query on the ambient media database 220 to identify a ambient media data entry 222 where the included demographic characteristics correspond to the identified demographic characteristics and may identify the ambient media genre related thereto.

If the associations are not known, then, in step 420, the transmitting unit 206 may electronically transmit a data signal superimposed with the demographic characteristics to the ambient media data agency 110. In step 422, the receiving unit 202 may receive a data signal from the ambient media data agency 110 superimposed with a ambient media genre associated with the demographic characteristics. In embodiments where the ambient media request may include multiple periods of time, a ambient media genre may be identified for the demographic characteristics for each of the periods of time.

Once the ambient media genres are identified, then, in step 424, the processing unit 204 may determine if specific songs are requested. The determination may be based on, for instance, data included in the ambient media request submitted by the merchant 104. If songs are not requested, then, in step 426, the transmitting unit 206 may electronically transmit a data signal superimposed with the identified ambient media genres to the merchant 104. If songs are requested, then, in step 428, the processing unit 204 may identify songs associated with the identified ambient media genres. The identification may include the execution of queries on databases configured to store associations between songs and ambient media genres. In step 430, a playlist module or engine of the processing unit 204 may generate a playlist of the identified songs. In step 432, the transmitting unit 206 may electronically transmit a data signal superimposed with the playlist to the merchant 104. In embodiments where the ambient media request includes multiple periods of time, a playlist may be provided to the merchant 104 for each of the periods of time based on the associated identified ambient media genre.

Figure 5:
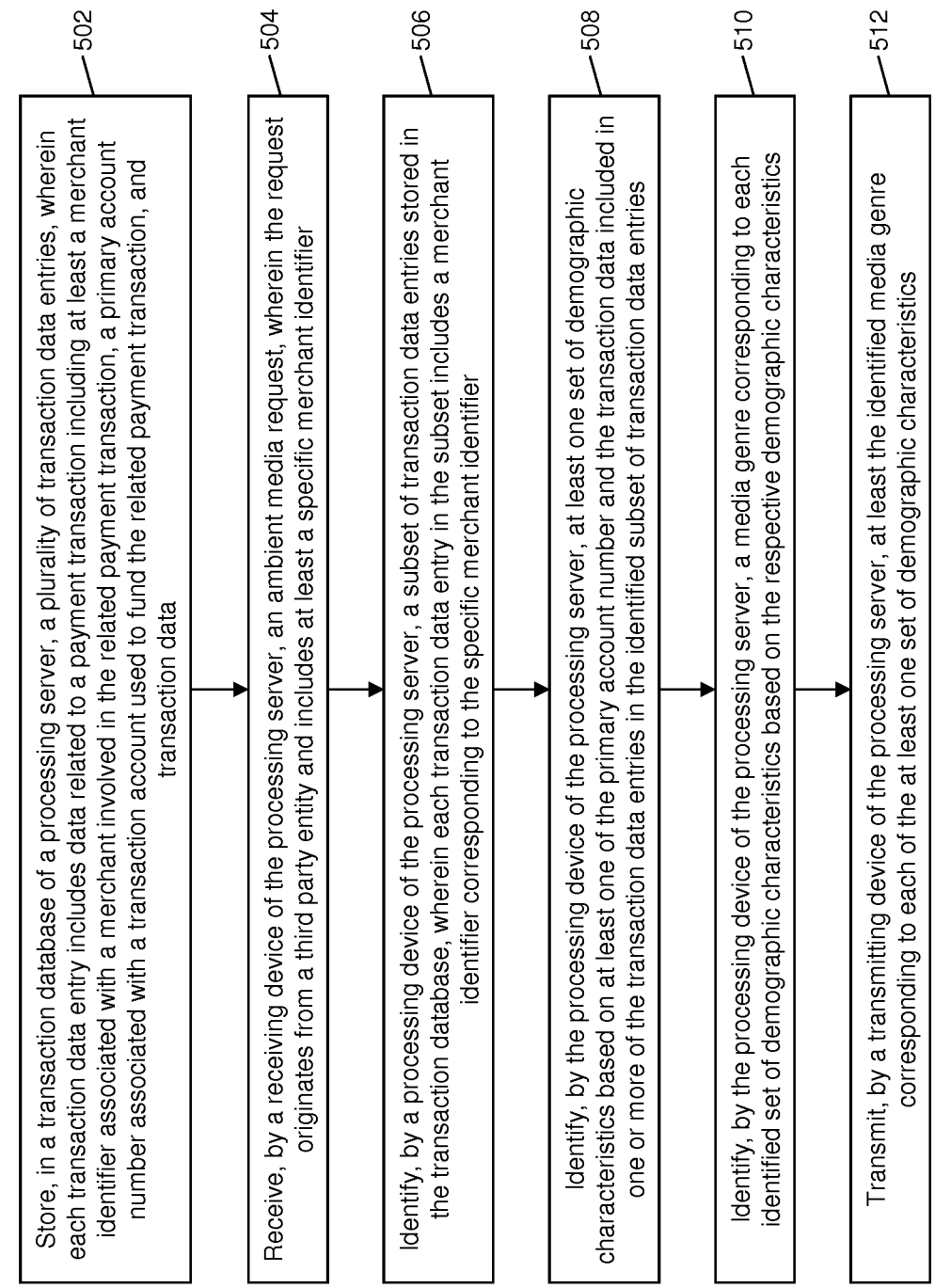
FIG. 5 is a flow chart illustrating an exemplary method for identifying ambient media selections based on transaction history in accordance with exemplary embodiments.

Exemplary Method for Identifying Ambient Media Selections Based on Transaction History FIG. 5 illustrates a method 500 for the identification of ambient media selections for a merchant based on transaction history involving the merchant and demographic characteristics associated with transaction accounts involved thereto.

In step 502, a plurality of transaction data entries (e.g., transaction data entries 210) may be stored in a transaction database (e.g., the transaction database 208) of a processing server (e.g., the processing server 102), wherein each transaction data entry includes data related to a payment transaction including at least a merchant identifier associated with a merchant (e.g., a merchant 104) involved in the related payment transaction, a primary account number associated with a transaction account used to fund the related payment transaction, and transaction data. In step 504, a ambient media request may be received by a receiving device (e.g., the receiving unit 202) of the processing server, wherein the request originates from a third party entity (e.g., the merchant 104) and includes at least a specific merchant identifier.

In step 506, a subset of transaction data entries stored in the transaction database may be identified by a processing device (e.g., the processing unit 204) of the processing server, wherein each transaction data entry in the subset includes a merchant identifier corresponds to the specific merchant identifier. In step 508, at least one set of demographic characteristics may be identified by the processing device of the processing server based on at least the primary account number and the transaction data included in one or more of the transaction data entries in the identified subset of transaction data entries.

In step 510, a ambient media genre corresponding to each identified set of demographic characteristics may be identified by the processing device of the processing server based on the respective demographic characteristics. In step 512, at least the identified ambient media genre corresponding to each of the at least one set of demographic characteristics may be transmitted by a transmitting device (e.g., the transmitting unit 206) of the processing server 102.

In one embodiment, the method 500 may further include storing, in an account database (e.g., the account database 212) of the processing server, a plurality of account profiles (e.g., account profiles 214), wherein each account profile 214 includes data related to a transaction account including at least a specific account number associated with the related transaction account and one or more demographic characteristics corresponding to one or more consumers associated with the related transaction account, wherein identifying the at least one set of demographic characteristics: includes identifying, by the processing device of the processing server, a subset of account profiles stored in the account database, wherein each account profile in the subset includes a specific account number corresponding to a primary account number included in at least one transaction data entry in the identified subset; and is based on the one or more demographic characteristics included in each account profile in the identified subset of account profiles.

In some embodiments, the method 500 may also include identifying, by the processing device of the processing server, a plurality of purchase behaviors based on at least the transaction data included in each transaction data entry in the identified subset of transaction data entries. In a further embodiment, the method 500 may even further include storing, in a purchase database (e.g., the purchase database 216) of the processing server, a plurality of purchase behaviors entries (e.g., purchase data entries 218), wherein each purchase behavior entry includes data related to a purchase behavior including at least one demographic characteristic associated with the related purchase behavior, and wherein identifying the at least one set of demographic characteristics: includes identifying, by the processing device of the processing server, a subset of purchase behavior entries stored in the purchase database, wherein each purchase behavior entry in the subset is related to a purchase behavior included in the identified plurality of purchase behaviors; and is based on the at least one demographic characteristic included in each purchase behavior entry in the identified subset of purchase behavior entries. In another further embodiment, the method 500 may even further include: transmitting, by the transmitting device of the processing server, a request for demographic characteristics, wherein the request includes at least the identified plurality of purchase behaviors; and receiving, by the receiving device of the processing server, the at least one set of demographic characteristics, wherein each of the at least one set of demographic characteristics is based on the identified plurality of purchase behaviors.

In one embodiment, the method 500 may further include storing, in a ambient media database (e.g., the ambient media database 220) of the processing server, a plurality of ambient media data entries (e.g., ambient media data entries 222), wherein each ambient media data entry includes data related to an ambient media selection including at least one or more demographic characteristics, wherein identifying a selection for each of the at least one set of demographic characteristics includes identifying a specific ambient media data entry stored in the ambient media database based on a correspondence between the included at least one or more demographic characteristics and the respective set of demographic characteristics, and the identified ambient media selection is the ambient media selection related to the identified specific ambient media data entry. In some embodiments, identifying a ambient media selection for each of the at least one set of demographic characteristics may include: transmitting, by the transmitting device of the processing server, a selection request for each of the at least one set of demographic characteristics, wherein the selection request includes at least the respective set of demographic characteristics; and receiving, by the receiving device of the processing server, the ambient media selection for each of the at least one set of demographics, wherein the ambient media selection is based on the respective set of demographic characteristics.

In one embodiment, the identified ambient media selection may be transmitted to the third party entity in response to the received ambient media request. In some embodiments, the identified ambient media selection may be transmitted to a playlist generation device, and the method 500 may further include: generating, by the playlist generation device, a playlist of one or more songs, wherein the playlist is based on at least the identified ambient media selection; and transmitting, by the transmitting device of the processing server, the generated playlist to the third party entity in response to the received ambient media request. In one embodiment, the identified ambient media selection may be transmitted to an ambient media emitting device (e.g., the ambient media emitting device 112), and the ambient media emitting device may be configured to identify and play one or more songs based on the identified ambient media selection.

In some embodiments, each set of demographic characteristics of the identified at least one set of demographic characteristics may be associated with one or more temporal characteristics, and the one or more temporal characteristics may be transmitted with the identified ambient media selection corresponding to the associated set of demographic characteristics. In a further embodiment, the one or more temporal characteristics may be based on at least the transaction data included in each of the one or more transaction data entries on which the associated set of demographic characteristics are based. In one embodiment, the transaction data may include at least one of: transaction time, transaction date, and day of week.

As discussed above, in some embodiments, the method 500 may be utilized for the identification of either music or visual content selections, or both, rather than just one type of selection. In such embodiments using visual content, a visual content request may be received, and visual content data identified based on the demographic characteristics, which may be transmitted in step 512. It will be apparent to persons having skill in the relevant art that, in such embodiments, additional steps to the method 500 discussed above, such as for the storage of ambient media data entries for identification of ambient media selections, may alternatively or additionally use visual content, such as a visual content database configured to store visual content data entries for identification of visual content selections.

Payment Transaction Processing System and Process

Figure 6:
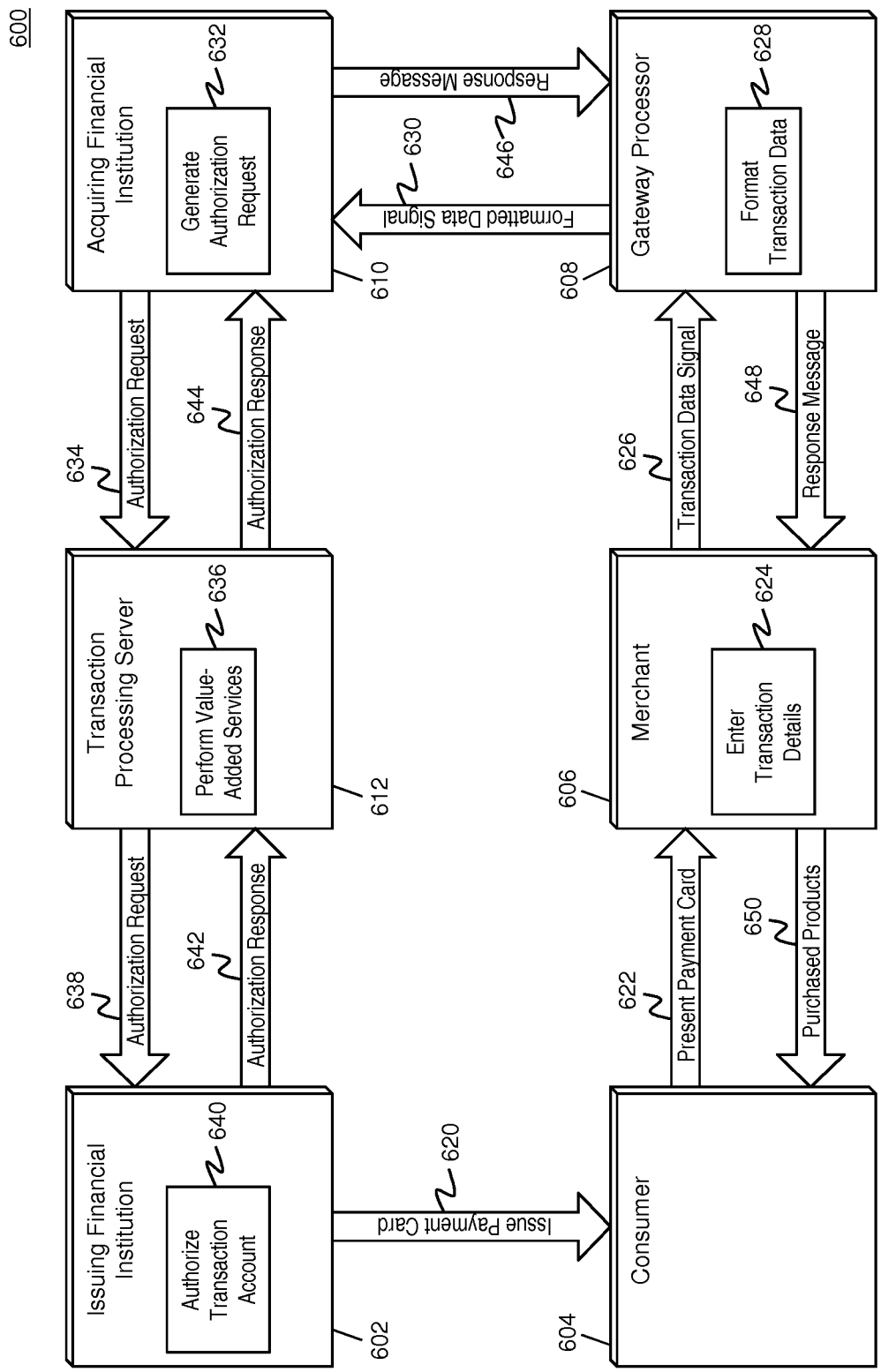
FIG. 6 is a flow diagram illustrating the processing of a payment transaction in accordance with exemplary embodiments.

FIG. 6 illustrates a transaction processing system and a process 600 for the processing of payment transactions in the system. The process 600 and steps included therein may be performed by one or more components of the system 100 discussed above, such as the merchant 104, processing server 102, and payment network 106. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3A, 3B, 4, and 5, discussed above, with respect to the step or steps involved in the processing of a payment transaction. In addition, the entities discussed herein for performing the process 600 may include one or more computing devices or systems configured to perform the functions discussed below. For instance, the merchant 604 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicate electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 640 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 602. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
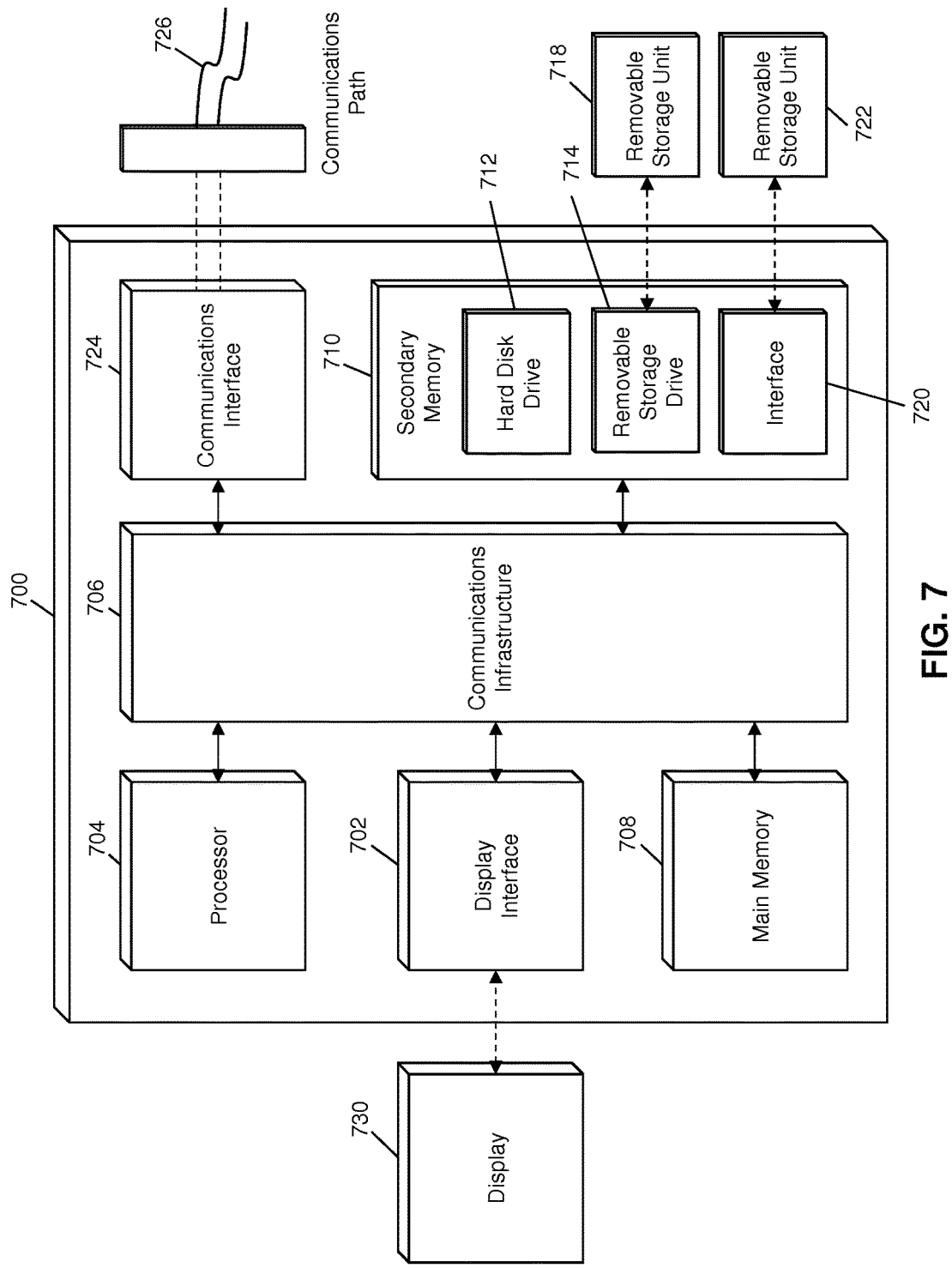
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, and 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for identifying ambient media selections (e.g., music and visual content selections) based on transaction history and consumer demographic characteristics. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying ambient media selections based on transaction history, comprising:

communicating, by a receiving device of a processing server, with a payment network and receiving, from the payment network, transaction data associated with a plurality of payment transactions conducted by a plurality of consumers, wherein the processing server is configured to communicate with the payment network using a specially configured infrastructure associated with the payment network;

storing, in a transaction database of the processing server, a plurality of transaction data entries for the plurality of consumers, wherein each transaction data entry is associated with a respective consumer of the plurality of consumers and includes respective transaction data, received from the payment network, related to a payment transaction including at least a merchant identifier associated with a merchant involved in the related payment transaction, and a primary account number associated with a transaction account, of the respective consumer, used in the related payment transaction;

receiving, by the receiving device of the processing server, an ambient media request, wherein the request originates from a processor of the merchant and includes at least a specific merchant identifier associated with the merchant;

identifying, by a processing device of the processing server, a subset of transaction data entries from the plurality of transaction data entries stored in the transaction database, wherein each transaction data entry in the subset includes a merchant identifier corresponding to the specific merchant identifier;

identifying, by the processing device of the processing server, at least one set of demographic characteristics of a group of consumers associated with the identified subset of transaction data entries based on at least one of the primary account number and the transaction data included in the transaction data entries in the identified subset of transaction data entries;

identifying, by the processing device of the processing server, an ambient media selection corresponding to each identified set of demographic characteristics based on the respective demographic characteristics of the group of consumers; and transmitting, by a transmitting device of the processing server, to the merchant at least the identified ambient media selection corresponding to each of the at least one set of demographic characteristics of the group of consumers.

2. The method of claim 1, further comprising:
storing, in an account database of the processing server, a plurality of account profiles, wherein each account profile includes data related to a transaction account including at least a specific account number associated with the related transaction account and one or more demographic characteristics corresponding to one or more consumers associated with the related transaction account, wherein identifying the at least one set of demographic characteristics
includes identifying, by the processing device of the processing server, a subset of account profiles stored in the account database, wherein each account profile in the subset includes a specific account number corresponding to a primary account number included in at least one transaction data entry in the identified subset, and
is based on the one or more demographic characteristics included in each account profile in the identified subset of account profiles.

3. The method of claim 1, further comprising:
identifying, by the processing device of the processing server, a plurality of purchase behaviors based on at least the transaction data included in each transaction data entry in the identified subset of transaction data entries.

4. The method of claim 3, further comprising:
storing, in a purchase database of the processing server, a plurality of purchase behaviors entries, wherein each purchase behavior entry includes data related to a purchase behavior including at least one demographic characteristic associated with the related purchase behavior, wherein identifying the at least one set of demographic characteristics
includes identifying, by the processing device of the processing server, a subset of purchase behavior entries stored in the purchase database, wherein each purchase behavior entry in the subset is related to a purchase behavior included in the identified plurality of purchase behaviors, and
is based on the at least one demographic characteristic included in each purchase behavior entry in the identified subset of purchase behavior entries.

5. The method of claim 3, wherein identifying the at least one set of demographic characteristics includes:
transmitting, by the transmitting device of the processing server, a request for demographic characteristics, wherein the request includes at least the identified plurality of purchase behaviors; and
receiving, by the receiving device of the processing server, the at least one set of demographic characteristics, wherein each of the at least one set of demographic characteristics is based on the identified plurality of purchase behaviors.

6. The method of claim 1, further comprising:
storing, in an ambient media database of the processing server, a plurality of ambient media data entries, wherein each ambient media data entry includes data related to an ambient media selection including at least one or more demographic characteristics, wherein
identifying an ambient media selection for each of the at least one set of demographic characteristics includes
identifying a specific ambient media data entry stored in the ambient media database based on a correspondence between the included at least one or more demographic characteristics and the respective set of demographic characteristics, and
the identified ambient media selection is the ambient media selection related to the identified specific ambient media data entry.

7. The method of claim 1, wherein identifying an ambient media selection for each of the at least one set of demographic characteristics includes:
transmitting, by the transmitting device of the processing server, a selection request for each of the at least one set of demographic characteristics, wherein the selection request includes at least the respective set of demographic characteristics; and
receiving, by the receiving device of the processing server, the ambient media selection for each of the at least one set of demographics, wherein the ambient media selection is based on the respective set of demographic characteristics.

8. The method of claim 1, wherein the identified ambient media selection is transmitted to the third party entity in response to the received ambient media request.

9. The method of claim 1, wherein
the identified ambient media selection is transmitted to a playlist generation device, and
the method further comprises:
generating, by the playlist generation device, a playlist of one or more songs, wherein the playlist is based on at least the identified ambient media selection; and
transmitting, by the transmitting device of the processing server, the generated playlist to the third party entity in response to the received ambient media request.

10. The method of claim 1, wherein
the identified ambient media selection is transmitted to an ambient media emitting device, and
the ambient media emitting device is configured to identify and play one or more songs based on the identified ambient media selection.

11. The method of claim 1, wherein
each set of demographic characteristics of the identified at least one set of demographic characteristics is associated with one or more temporal characteristics, and
the one or more temporal characteristics is transmitted with the identified ambient media selection corresponding to the associated set of demographic characteristics.

12. The method of claim 11, wherein the one or more temporal characteristics are based on at least the transaction data included in each of the one or more transaction data entries on which the associated set of demographic characteristics are based.

13. The method of claim 1, wherein the transaction data includes at least one of: a transaction time, a transaction date, and a day of week.

14. The method of claim 1, wherein the ambient media includes at least one of: music, images, video, lighting, and combinations thereof.

15. A system for identifying ambient media selections based on transaction history, comprising:
a receiving device, of a processing server, configured to (i) communicate with a payment network, (ii) receive, from the payment network, transaction data associated with a plurality of payment transactions conducted by a plurality of consumers, and (iii) receive an ambient media request, wherein the request originates from a processor of a merchant and includes at least a specific merchant identifier associated with the merchant, wherein the processing server is configured to communicate with the payment network using a specially configured infrastructure associated with the payment network;

a transaction database, of the processing server, configured to store a plurality of transaction data entries for the plurality of consumers, wherein each transaction data entry is associated with a respective consumer of the plurality of consumers and includes respective transaction data, received from the payment network, related to a payment transaction including at least a merchant identifier associated with a respective merchant involved in the related payment transaction, and a primary account number associated with a transaction account used in the related payment transaction;

a processing device of the processing server configured to
identify a subset of transaction data entries from the plurality of transaction data entries stored in the transaction database, wherein each transaction data entry in the subset includes a merchant identifier corresponding to the specific merchant identifier,
identify at least one set of demographic characteristics of a group of consumers associated with the identified subset of transaction data entries based on at least one of the primary account number and the transaction data included in the transaction data entries in the identified subset of transaction data entries, and
identify an ambient media selection corresponding to each identified set of demographic characteristics based on the respective demographic characteristics of the group of consumers; and a transmitting device of the processing server configured to transmit, to the merchant, at least the identified ambient media selection corresponding to each of the at least one set of demographic characteristics of the group of consumers.

16. The system of claim 15, further comprising:
an account database of the processing server configured to store a plurality of account profiles, wherein each account profile includes data related to a transaction account including at least a specific account number associated with the related transaction account and one or more demographic characteristics corresponding to one or more consumers associated with the related transaction account, wherein
identifying the at least one set of demographic characteristics
includes identifying, by the processing device of the processing server, a subset of account profiles stored in the account database, wherein each account profile in the subset includes a specific account number corresponding to a primary account number included in at least one transaction data entry in the identified subset, and
is based on the one or more demographic characteristics included in each account profile in the identified subset of account profiles.

17. The system of claim 15, wherein the processing device of the processing server is further configured to identify a plurality of purchase behaviors based on at least the transaction data included in each transaction data entry in the identified subset of transaction data entries.

18. The system of claim 17, further comprising:
a purchase database of the processing server configured to store a plurality of purchase behaviors entries, wherein each purchase behavior entry includes data related to a purchase behavior including at least one demographic characteristic associated with the related purchase behavior, wherein
identifying the at least one set of demographic characteristics
includes identifying, by the processing device of the processing server, a subset of purchase behavior entries stored in the purchase database, wherein each purchase behavior entry in the subset is related to a purchase behavior included in the identified plurality of purchase behaviors, and
is based on the at least one demographic characteristic included in each purchase behavior entry in the identified subset of purchase behavior entries.

19. The system of claim 17, wherein identifying the at least one set of demographic characteristics includes:
transmitting, by the transmitting device of the processing server, a request for demographic characteristics, wherein the request includes at least the identified plurality of purchase behaviors; and
receiving, by the receiving device of the processing server, the at least one set of demographic characteristics, wherein each of the at least one set of demographic characteristics is based on the identified plurality of purchase behaviors.

20. The system of claim 15, further comprising:
an ambient media database of the processing server configured to store a plurality of ambient media data entries, wherein each ambient media data entry includes data related to an ambient media selection including at least one or more demographic characteristics, wherein
identifying an ambient media selection for each of the at least one set of demographic characteristics includes identifying a specific ambient media data entry stored in the ambient media database based on a correspondence between the included at least one or more demographic characteristics and the respective set of demographic characteristics, and
the identified ambient media selection is the ambient media selection related to the identified specific ambient media data entry.

21. The system of claim 15, wherein identifying an ambient media selection for each of the at least one set of demographic characteristics includes:
transmitting, by the transmitting device of the processing server, a selection request for each of the at least one set of demographic characteristics, wherein the selection request includes at least the respective set of demographic characteristics; and
receiving, by the receiving device of the processing server, the ambient media selection for each of the at least one set of demographics, wherein the ambient media selection is based on the respective set of demographic characteristics.

22. The system of claim 15, wherein the identified ambient media selection is transmitted to the third party entity in response to the received ambient media request.

23. The system of claim 15, wherein
the identified ambient media selection is transmitted to a playlist generation device,
the playlist generation device is configured to generate a playlist of one or more songs, wherein the playlist is based on at least the identified ambient media selection, and the transmitting device of the processing server is further configured to transmit the generated playlist to the third party entity in response to the received ambient media request.

24. The system of claim 15, wherein
the identified ambient media selection is transmitted to an ambient media emitting device, and
the ambient media emitting device is configured to identify and play one or more songs based on the identified ambient media selection.

25. The system of claim 15, wherein
each set of demographic characteristics of the identified at least one set of demographic characteristics is associated with one or more temporal characteristics, and
the one or more temporal characteristics is transmitted with the identified ambient media selection corresponding to the associated set of demographic characteristics.

26. The system of claim 25, wherein the one or more temporal characteristics are based on at least the transaction data included in each of the one or more transaction data entries on which the associated set of demographic characteristics are based.

27. The system of claim 15, wherein the transaction data includes at least one of: a transaction time, a transaction date, and a day of week.

28. The system of claim 15, wherein the ambient media includes at least one of: music, images, video, lighting, and combinations thereof.

* * * * *